YOKE DI/DT MONITORING CATHODE RAY TUBE PROTECTION

Filed Jan. 14, 1969 2 Sheets-Sheet 1

INVENTORS
DAVID L. JOHNSTON
MICHAEL M. SIVERLING
MELVIN G. WILSON
BY
Sughrue, Rothwell, Mion, Zinn & Macpeak
ATTORNEYS

YOKE DI/DT MONITORING CATHODE RAY TUBE PROTECTION

United States Patent Office 3,501,670
Patented Mar. 17, 1970

3,501,670
YOKE DI/DT MONITORING CATHODE RAY TUBE PROTECTION

David L. Johnston, Michael M. Siverling, and Melvin G. Wilson, Rochester, Minn., assignors to International Business Machines Corporation, Armonk, N.Y., a corporation of New York

Filed Jan. 14, 1969, Ser. No. 791,035
Int. Cl. H01j *29/70*
U.S. Cl. 315—20 8 Claims

ABSTRACT OF THE DISCLOSURE

In a cathode ray tube beam deflection circuit means are provided for compensating for the voltage drop across the internal resistance of the coil sections in the deflection circuit. The deflection voltage across the deflection circuit and the voltage across the external resistor which is in series with each coil section are applied to the inputs of a differential amplifier. This has the effect of subtracting out the internal resistive voltage component of the deflection voltage. The output signal of the differential amplifier is thereby proportional only to beam velocity $$\left(L\frac{di}{dt}\right)$$

The magnitude of this signal is in effect compared to preset minimum positive and negative voltages representing minimum allowable beam velocity. The polarity of this signal represents the direction of beam travel and is compared to predetermined beam direction logic signals. If these comparisons indicate either that the beam is failing to travel at the minimum velocity or in the direction established by the logic signals, then a failure signal is generated, and this signal may be used to bias the cathode ray tube to blank the tube. An editing circuit consisting of logical elements functions to provide a time interval during which the beam is not blanked so as to permit the beam within this time interval to be at zero velocity such as when the beam reverses direction.

BACKGROUND OF THE INVENTION

Field of the invention

The invention broadly relates to the field of cathode ray tube beam deflection circuits. The invention is particularly concerned with compensating for the voltage drop across the internal resistance of the beam deflection coil sections, and generating a signal proportional only to the velocity at which a cathode ray beam is swept by the deflection coil circuits this signal being used to protect the face of the cathode ray tube from burning.

Description of the prior art

It is known to utilize the deflection voltage applied to the horizontal and vertical deflection coils of a cathode ray tube as the input signal to a tube-protective circuit. In such systems the voltage is used to generate a DC signal proportional to beam velocity. This signal may be used to directly control the grid current so that when beam velocity falls to zero the beam intensity also falls to a low level; or the DC signal may operate a relay to disconnect the power supply when the signal falls below a prescribed value.

None of these known systems contain means to compensate for the voltage developed in the internal resistance of the deflection coils. Thus the signal developed cannot be an accurate representation of the actual velocity of the cathode ray tube beam. Nor do the prior art systems contain means for checking the accuracy of the response of the cathode beam to its directional commands.

Summary of the invention

This invention may be broadly summarized as means for compensating for the voltage drop due to the internal resistance of the deflection coil section of the deflection coil circuit of a cathode ray tube. More particularly, a voltage signal is developed which is proportional only to the veolcity at which the beam of the cathode ray tube is driven, horizontal or vertical, by the deflection coil circuit.

This voltage signal is compared to preset minimum positive and maximum negative threshold voltages, representing the minimum velocity at which the beam may be swept without damage to the tube face. Should the voltage signal fall inside these threshold limits, a beam failure signal is generated. The polarity of this voltage signal is also compared to predetermined beam direction logic signals. If this comparison results in a failure, indicating that the beam is not following it logic commands, a beam failure signal is generated. Provision is also made for editing out failure signals of short duration, such as those which occur when the beam reverses direction.

DETAILED DESCRIPTION OF THE DRAWINGS

In the embodiment of the cathode ray tube protection circuit to be described below, the deflection coil system is comprised of two linear deflection coil circuits, one for deflecting the beam in the horizontal direction, and the other for controlling vertical deflection. Each deflection coil circuit comprises a positive and negative portion, each having a coil section in series with an external resistor. The deflection velocity of the cathode beam is determined by the inductive component of the coil circuit voltage. But a direct measurement of the voltage applied to the coil section does not accurately represent the velocity of beam travel, because of the resistive voltage drop within the coil section. In this invention, compensation is made for this voltage drop using the voltage drop across the known external series resistor.

Figure 1:
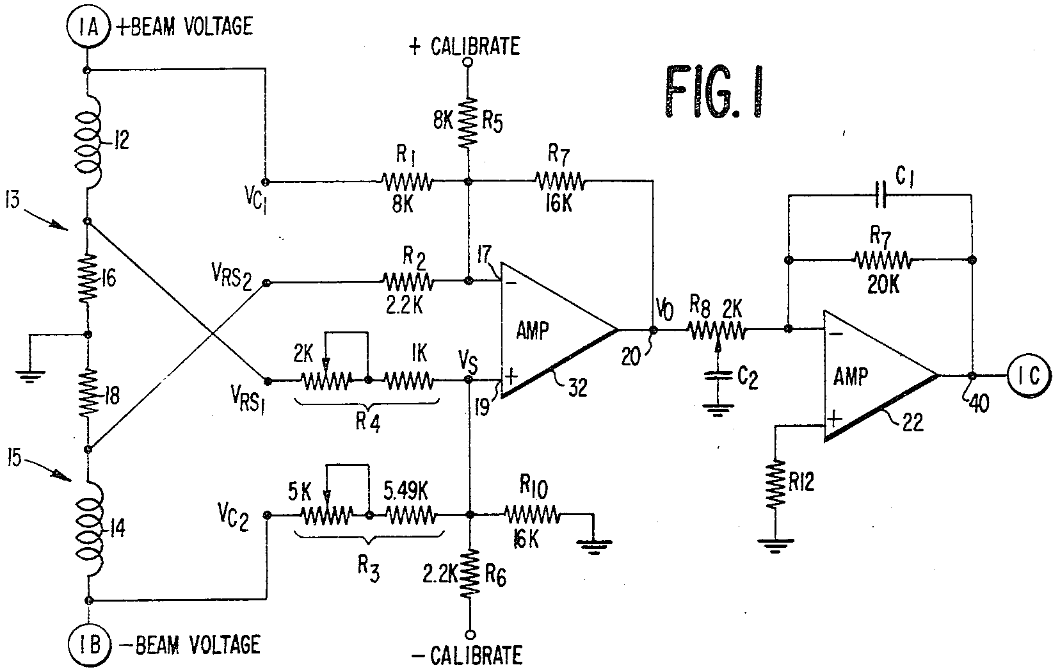
FIGURE 1 is a combined schematic circuit and block diagram of a system for deriving a signal proportional to the velocity at which a cathode ray tube beam is deflected in a linear direction by the coil deflection circuit of the cathode tube.

Referring to FIGURE 1, which is a schematic diagram of a signal deriving system constructed in accordance with this invention, a linear deflection coil circuit is shown consisting of a positive portion 13 having a coil section 12 and associated series resistor 16, and a negative portion 17 consisting of a coil section 14 and associated series resistor 18. Each portion has a separate applied deflection voltage portion 13 being used to control deflection in a positive linear direction, portion 17 being used to control deflection in the negative linear direction. Each of these coil sections 12, 14 also has some internal resistance.

The function of the signal deriving system described here is to generate a voltage signal $V_0$ which is proportional solely to beam velocity in a linear direction. If the voltage $V_0$ is to accurately represent the rate of beam deflection, compensation must be made for the voltage drop across the internal resistance of each of the coil sections. This invention provides means for making this compensation by adjusting the gain of differential amplifier 32 which is of conventional design as will be described below. The inputs to this amplifier are derived from the linear deflection coil circuit. This amplifier is also used to derive a voltage signal $V_0$ proportional to the difference between the inductive components of the deflection voltages, which voltage signal then represents resultant beam velocity in a linear direction.

Voltage $V_{c1}$ the deflection voltage induced by the current applied to coil section 12 and its associated series resistor 16, is coupled to one input 17 of differential amplifier 32. Voltage $V_{RS_1}$, the voltage drop across series resistor 16 alone, is applied to input 19 of the amplifier. It is known that the output voltage $V_0$ at output 20, given these two inputs, is:

$$V_0=G(v_{c_1}-KV_{RS_1})=GL\frac{di}{dt}$$

where G is a constant equal to the gain of the amplifier. Thus, given these two inputs, the voltage $V_0$ at output 20 is equal to the inductive voltage across coil section 12, multiplied by a constant G. If coil 12 were an ideal coil, and a standard sawtooth deflection current was applied to input 1A, then the voltage $V_0$ would be the voltage across coil 12, so that $$V_0=L\frac{di}{dt}$$

where L is the inductance of coil 12 and *i* is the applied deflection current, and $V_0$ should be a square wave. The gain of amplifier 32 relative to input voltage $V_{RS_1}$ is adjusted in the manner described below. By this adjustment the voltage $V_S$ applied to input 19 accounts for both the voltage drop $V_{RS_1}$ across series resistor 16, and also for the voltage due to the internal resistance of the coil.

Resistors $R_7$, $R_1$ and $R_{10}$ are of fixed predetermined values, so that the gain applied to input voltage $V_{C_1}$ is fixed. Resistors $R_2$ and $R_3$, whose function is described below, are so constructed that they may be removed from the machine. Resistors $R_5$ and $R_6$ must now be grounded to substitute for reflected impedance of $R_2$ and $R_3$. If a sawtooth current is now applied to input 1A, variable resistor $R_4$ can be adjusted, adjusting the gain of voltage signal $V_{RS_1}$ until a square wave appears as the output $V_0$. By this adjustment allowance is made for the voltage drop across the internal resistance of the coil section 12.

Resistors $R_2$ and $R_3$ are now replaced in the machine. The calibration resistors are not now needed. A sawtooth current is applied to input 1B. The gain of voltage signal $V_{RS_2}$ is fixed by fixed resistor $R_2$. The gain of voltage signal $V_{C_2}$ is adjusted until $V_0$ is again a square wave. This compensates for the internal resistance of coil section 14. As a result of this calibration procedure, when deflection currents are applied to inputs 1A, 1B, the output $V_0$ is proportional only to the difference in the inductive voltages across deflection coil sections 12, 14, and thereby proportional only to beam velocity in the linear direction controlled by these two coil sections.

The amplifier 22 is not strictly necessary to the successful operation of this system, and was included only to provide sufficient gain using presently available components. Resistor $R_{12}$ is for impedance-matching purposes only; capacitors $C_1$ and $C_2$ may be included where shown in order to avoid instability by providing a high-frequency roll-off characteristic.

The signal deriving system illustrated in FIGURE 1 and described above is only one of two such systems required; one system serves to derive a signal proportional to the voltage appearing across the two sections of the vertical deflection coil circuit, the other system to perform the same function for the two sections of the horizontal deflection coil circuit.

The output signals 1C as they appear at output 40 will be used to generate "beam o.k." or "beam failure" signals as will now be described.

Figure 2:
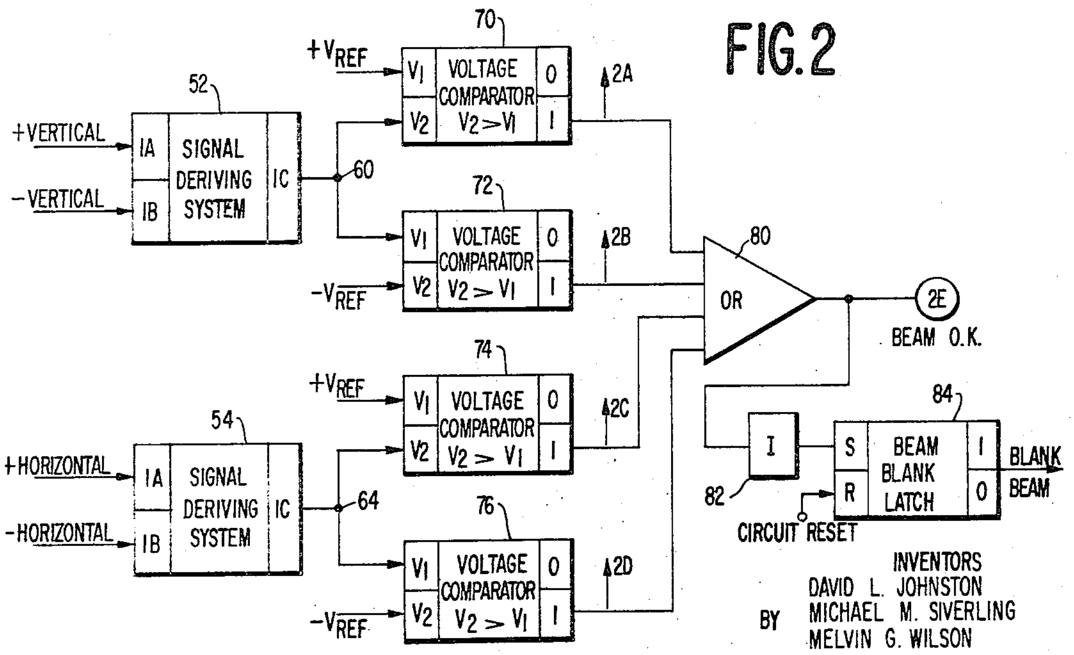
FIGURE 2 is a block diagram of a system for determining if the beam is moving at greater than a fixed minimum velocity.

FIGURE 2 is a block diagram of a system for determining if the beam is moving at the minimum sweep speed, using the signal derived by the system of FIGURE 1.

It has been determined that in typical usages of cathode ray tubes in reading and display equipment, such as prior art optical readers, that to prevent damage to the tube face the beam should be blanked immediately if it is not moving at more than 1000 inches per second. It can be determined by consideration of the parameters of the particular type of deflection coil system to be used and the gain of the amplifiers 22, 32 what voltage $V_0$ (as calculated above) corresponds to this minimum sweep speed. As is shown in FIGURE 2 and as will be described below, several voltage magnitude comparators are employed to generate a "beam o.k." signal if the beam is being swept at greater than the minimum safe speed, or to generate a beam failure signal to be used to blank the beam within a few microseconds if beam speed falls below this established minimum. In the embodiment shown and described, beam travel in four compass directions under the control of vertical and horizontal; deflection coil circuits will be considered. The actual scope of the invention is not to be considered to be limited to this example. For the sake of consistency in explaining the outputs of the binary logic elements used in this embodiment, a "one" is equivalent to an "up level" output, a "zero" is equivalent to a "down level" output.

The system blocks of FIGURE 2 may be divided into three groups. These are the signal deriving systems, the minimum threshold comparison section, and the decision section. The signal deriving systems 52, 54 are as shown and described in FIGURE 1. The vertical and horizontal deflection currents are the inputs 1A, 1B to systems 52, 54 respectively. The outputs 1C therefore have a magnitude proportional to the speed of beam travel in the vertical and horizontal directions, respectively, and the polarity of these voltages indicates the specific direction of beam travel. The output 60 of system 52 indicates whether the beam travel is up or down, and the output 64 of system 54 indicates whether beam travel is right or left. For the sake of this exemplary embodiment, it will be assumed that an absolute magnitude of 150 millivolts as measured at 60 or 64 will represent the minimum safe beam sweep speed of 1000 inches per second. Voltage comparators 70, 72, 74, 76 are conventional threshold devices of a suitable design wherein a comparison is made between some pre-established threshold voltage magnitude and some unknown voltage. Each of these devices are so designed that when the absolute magnitude of the unknown voltage exceeds said threshold, a binary one is generated; for all other cases the comparator output is a binary zero. In this embodiment the magnitude of the threshold reference voltage $V_{REF}$ applied to each of the four voltage comparators as shown is 150 millivolts. Therefore, if the output 60 of signal deriving system 52 is greater than 150 millivolts, then a binary one will appear as output 2A of comparator 70, indicating that the beam is moving in a positive vertical direction at a speed greater than 1000 inches per second. Similarly, if the beam were moving vertically down at more than 1000 inches per second, a voltage would be generated at 60 with a magnitude greater than 150 millivolts and a negative polarity, then $V_2$ of comparator 72 (i.e. $-V_{REF}$) would be greater than $V_1$ and a binary one would be generated at output 2B.

The outputs of comparators 70–76 are connected to an OR gate 80. If the output of any one or more of these comparators is a binary one, a "beam o.k." signal is generated at output 2E.

Should the beam fail to move at sufficient speed in any of the four directions, the output from OR gate 80 is a zero, which when applied as the input to inverter 82 serves to set a beam blank latch 84. The output from latch 84, a beam failure signal, operates a relay (not shown) to shut down the equipment, since the equipment is not functioning properly, until the circuit reset is operated.

Figure 3:
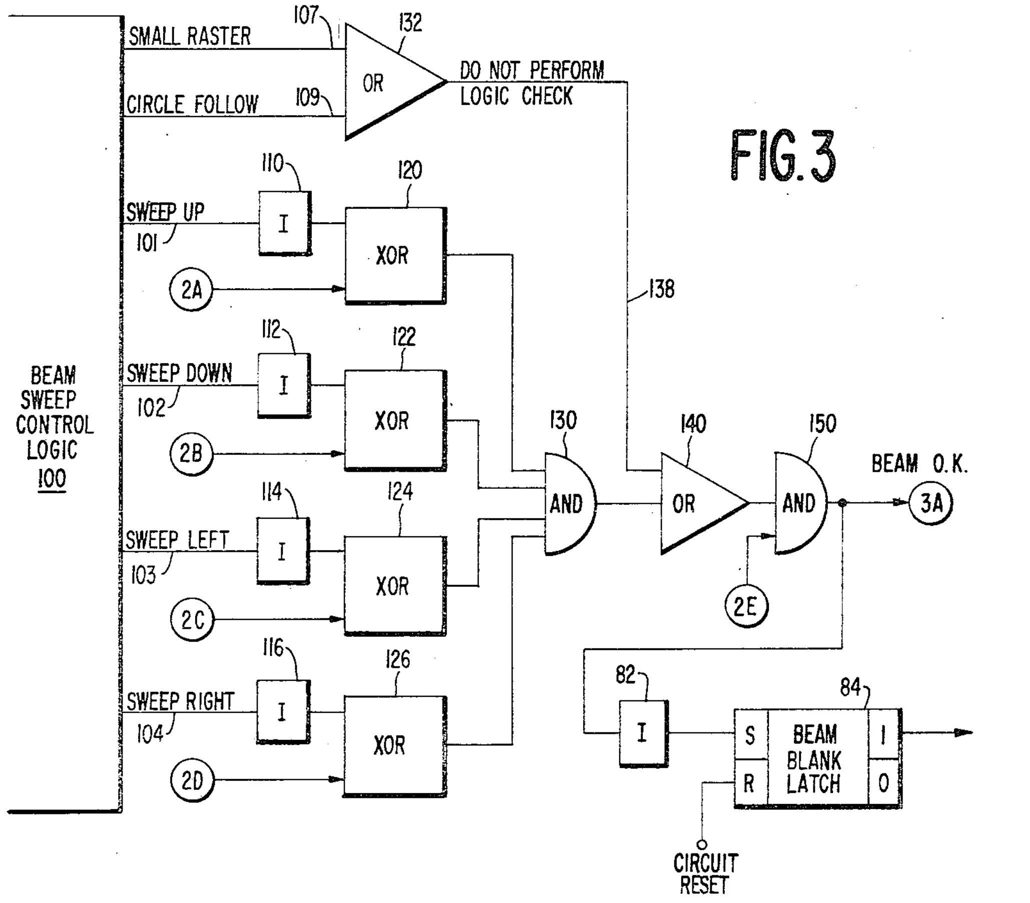
FIGURE 3 is a block diagram of a system for determining if the beam is following its predetermined logic signals to be used in conjunction with the system of FIGURE 2.

FIGURE 3 is a block diagram of a system for determining if the cathode ray tube beam is responding correctly to its predetermined beam direction logic signals. A failure signal would be generated if the beam is not following these logic signals, even though the output of the system of FIG. 2 indicates that the beam is moving with sufficient speed. This control logic versus beam direction system comprises beam sweep control logic 100, inverters 110, 112, 114 and 116, EXCLUSIVE–OR gates 120, 122, 124 and 126, OR gate 140, and AND gates 130 and 150. When this feature is incorporated in the overall beam monitoring system, the "beam o.k." signal is now taken from output 3A of AND gate 150; the beam o.k. decision signal 2E which is the output of OR gate 80 as shown in FIG. 2 is one of the two inputs to this AND gate.

The beam logic versus beam direction system operates as follows: in the beam sweep control logic 100, which itself forms no part of this invention and may be the control logic for generating beam direction logic commands such as in conventional optical readers, a binary one is generated on respective output lines 101–104 indicating that the beam is being commanded to move up, down or to the left or right. Since binary one signals will exist on one, or at the most two of the four output lines at any given time, a zero will be carried on the remaining lines. Each of these four signals is fed to one of the INVERTERS 110–116, the outputs of which are connected to EXCLUSIVE–OR gates 120–126 respectively. The other inputs to said EXCLUSIVE–OR gates are the outputs from the voltage comparators 70–76, respectively, shown in FIG. 2. The outputs of the EXCLUSIVE–OR gates are applied to AND gate 130. Said AND gate 130 generates a binary one only if the input signal on each of its four input lines is a binary one. This requires that disagreement exist between the two inputs to each of the four EXCLUSIVE–OR gates 120–126. Considering EXCLUSIVE–OR gate 120 for example, if the beam logic signal is presently commanding the beam to move up, a one will appear on output line 101, which will be inverted to a zero by inverter 110. This will be one input to gate 120. If the beam is in fact moving up faster than the minimum speed, then as explained previously a one level output will be generated by voltage comparator 70 and appear on line 2A as the other input to gate 120. Since the two inputs disagree, an output one will be generated. If the beam was not in fact moving up or not moving fast enough, the output 2A of comparator 70 would be a zero; the two inputs of gate 120 would agree, and its output would be zero; AND gate 130 is not energized and a failure signal must result.

The output of AND gate 130 is applied to OR gate 140, the output of this OR gate being one of the inputs to AND gate 150, whose other input is the "beam o.k." signal 2E derived as shown in FIG. 2. If the beam is moving faster than the minimum speed required, and is following its logic commands as indicated by a one output from AND gate 130, a beam o.k. signal is generated by gate 150. If no such signal is being generated then inverter 82 operates latch 84 as previously described to provide a beam failure signal to be used to blank the beam.

There are situations, such as when the beam is commanded to move in the circle follow mode, or small raster or beam rotate mode, where the beam will be moving with sufficient speed, but where no acceptable beam direction logic signals are available. To provide for such cases, OR gate 140 is inserted to serve as a defeat switch for the system of FIG. 3; input 138, labelled "do not perform logic check," will enable OR gate 140 to introduce an artificial "logic check o.k." signal as the necessary other input to AND gate 140. Line 138 will carry a signal to enable gate 140 if OR gate 132 is energized by an input on any of lines 107, 108 or 109, indicating that the beam is operating in one of the unusual modes suggested above.

Figure 4:
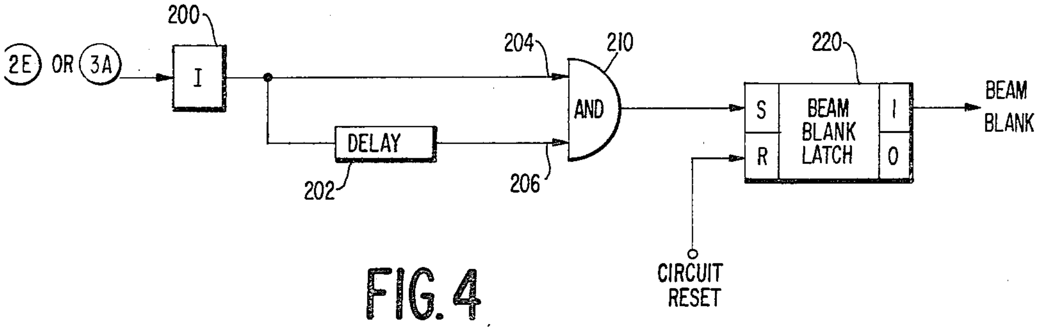
FIGURE 4 is a block diagram of a system for editing out failure pulses of insignificantly short duration, to be used in conjunction with the system of FIGURE 2.

FIG. 4 is a block diagram of a circuit for editing out failure pulses (i.e. pulses indicating the beam is moving with insufficient speed) which are of such short duration that no permanent damage could be done to the tube. These pulses occur, for example, when the beam reverses its up-down or left-right motion. This small pulse edit circuit consists of INVERTER 200, delay circuit 202, AND gate 210 and beam blanking latch 220. The delay line 202 is of a suitable type to provide a delay on the order of 1–100 microseconds.

The input to the small pulse edit system is either output 3A of FIGURE 3 or output 2E of FIGURE 2. When this output signal is a "beam o.k." signal, a binary one is the input to INVERTER 200. The inputs 204, 206 of AND gate 210 must then be zero's, and the gate is not energized, If the input 2E/3A indicates a beam failure, a binary one appears immediately at input 204 of AND gate 210, but input line 206, because of delay line 202, will not carry a binary one until the signal has traversed the delay line 202. If the failure pulse is of very short duration, on the order of less than ten microseconds, binary one outputs will not appear in coincidence on lines 204 and 206 and the gate 210 will not be energized. If the failure pulse is of sufficient duration, gate 210 will be energized, and the beam blank latch 220 will produce a command pulse to be used to blank the cathode ray tube beam. The beam will remain blanked until the "circuit reset" input is actuated.

While the invention has been particularly shown and described with reference to preferred embodiments thereof, it will be understood by those skilled in the art that various changes in form and details may be made therein without departing from the spirit and scope of the invention.

What is claimed is:

1. A system for compensating for the internal resistance of a deflection coil in a cathode ray beam deflection coil circuit, said deflection coil circuit having a first coil section connected in series with a first resistor, and having a first deflection voltage applied to the series combination of said first coil section and said first resistor, said system comprising:

a differential amplifier having first and second inputs,
first means coupling said first deflection voltage to said first input,
second means coupling the voltage across said series resistor to said second input, and
first control means connected to one of said first and second coupling means for altering the gain of said differential amplifier to compensate for the internal resistance of said first coil section.

2. A system as claimed in claim 1, wherein said deflection coil circuit further includes a second coil section connected in series with a second resistor, and has a second deflection voltage applied to the series combination of said second coil section and said second series resistor, said system further comprising third means coupling said second deflection voltage to said second input,
fourth means coupling the voltage across said second series resistor to said first input, and
second control means connected to one of said third and fourth coupling means for altering the gain of said differential amplifier to compensate for the internal resistance of said second coil section, whereby the output of said differential amplifier is proportional to the resultant velocity of said cathode ray beam.

3. A system as claimed in claim 2 wherein said first control means is connected to said second coupling means, and said second control means is connected to said third coupling means.

4. A system for comparing the velocity at which a cathode ray tube beam is swept by a deflection coil circuit across the face of the tube to a pre-set minimum velocity and for providing shut-off proteciton against beam sweep failure, the deflection coil circuit having first and second coil sections, said coil sections each having internal resistance and being connected in series with first and second external resistors respectively, and means for applying first and second deflection voltages to the first and second series combinations, respectively, of coil section and external resistor, said system comprising, (a) a differential amplifier having first and second inputs to which said first and second deflection voltages are respectively applied, the output of said amplifier being a voltage signal having a magnitude proportional only to beam velocity and having a polarity indicative of the direction of beam travel, (b) compensation means coupled to said deflection coil circuit and to said first and second differential amplifier inputs for altering the gain of said differential amplifier to provide compensation for the internal resistances of said coil sections, (c) means for comparing the magnitude of said voltage signal to a pre-established voltage threshold corresponding to a minimum velocity, (d) means coupled to said comparing means for providing output signals indicative of said beam velocity relative to said minimum velocity, and (e) means response to said output signals for generating a beam shut-off signal if said voltage signal falls below said threshold.

5. A system as claimed in claim 4 wherein said compensating means comprises (a) first means coupling said first deflection voltage to said first input, (b) second means coupling said second deflection voltage to said second input, (c) third means coupling the voltage across said first series resistor to said second input, (d) fourth means coupling the voltage across said second series resistor to said first input, (e) first control means connected to one of said first and third coupling means for altering the gain of said differential amplifier to compensate for the internal resistance of said first coil section and (f) second control means connected to one of said second and fourth coupling means for altering the gain of said differential amplifier to compensate for the internal resistance of said second coil section.

6. A system as claimed in claim 4 further comprising means for editing said beam shut-off signal, whereby said shut-off signal is inhibited if said beam sweep velocity is below said minimum velocity for a maximum time interval of such short duration that the face of the tube cannot be damaged.

7. A system as claimed in claim 6 wherein said means for editing the beam shut-off signal comprises an inverter, means coupling said output signals to said inverter, a delay line coupled to the output of said inverter, said delay line having a delay time equal to the said maximum time interval, an AND gate having first and second inputs, first means coupling the output of said inverter to one of said AND gate inputs, second means coupling the output of said delay line to the other of said AND gate inputs, and a beam blanking latch coupled to the output of said AND gate for generating a beam shut-off signal when the sweep velocity of said cathode ray tube beam is less than the pre-set minimum velocity for a period of time greater than the delay time of said delay line.

8. A system as claimed in claim 4 for generating a failure signal if the beam is not following predetermined beam direction logic signals, said system further comprising:

a plurality of voltage comparing means responsive to the output of said voltage signal deriving means for generating digital signals representing the direction in which the cathode beam is moving, and logic circuit means responsive to said predetermined beam direction logic signals and to said digital signals for generating a beam shut-off signal if the beam is not moving in the direction specified by said predetermined beam direction logic signals.

References Cited

UNITED STATES PATENTS

| | | | |
|---|---|---|---|
| 2,789,251 | 4/1957 | Ebbeler | 315—20 |
| 2,808,536 | 10/1957 | Musolf et al. | 315—20 |
| 3,399,324 | 8/1968 | Brown | 315—20 |

RODNEY D. BENNETT, Jr., Primary Examiner

J. G. BAXTER, Assistant Examiner